United States Patent [19]
Davis

[11] 3,875,293
[45] Apr. 1, 1975

[54] RECOVERY OF BROMINE FROM ORGANIC BROMIDES

[75] Inventor: Ralph A. Davis, Midland, Mich.

[73] Assignee: The Dow Chemical Co., Midland, Mich.

[22] Filed: Dec. 7, 1970

[21] Appl. No.: 95,883

[52] U.S. Cl............ 423/481, 260/654 D, 260/656 R
[51] Int. Cl............................................. C01b 7/12
[58] Field of Search.......... 23/154, 216; 260/656 R, 260/654 D; 423/481, 488

[56] References Cited
UNITED STATES PATENTS

| | | | |
|---|---|---|---|
| 2,025,032 | 12/1935 | Arnold et al.................... | 260/668 R |
| 2,504,919 | 4/1950 | Bordner....................... | 260/656 R X |
| 2,803,669 | 8/1957 | Brainerd, Jr. et al............. | 23/154 X |
| 2,886,605 | 5/1959 | McClure et al.............. | 260/656 R X |
| 3,125,608 | 3/1964 | McDonald...................... | 260/656 R |
| 3,310,380 | 3/1967 | Lester................................ | 23/154 X |
| 3,705,010 | 12/1972 | Davis et al.......................... | 423/502 |

*Primary Examiner*—Edward Stern
*Attorney, Agent, or Firm*—Robert W. Selby

[57] ABSTRACT

Disclosed is method of recovering bromine as HBr from organic bromides. The method involves reacting the organic bromide with hydrogen at a temperature within the range of from 300° to 600°C in the presence of a catalyst. The catalyst is selected from one or more of the oxides of chromium, vanadium, tungsten, molybdenum, cerium or aluminum.

34 Claims, No Drawings

RECOVERY OF BROMINE FROM ORGANIC BROMIDES

BACKGROUND OF THE INVENTION

Certain parts of the world, in which there is a shortage of bromine, find it necessary to import this useful halogen either in the elemental form or as HBr. A major use for bromine is in the preparation of methyl bromide. A convenient method of preparing methyl bromide is by the high temperature reaction of methyl alcohol and HBr in the presence of a contact catalyst. In order to carry out such a process, a ready supply of HBr is desirable. Bromine poor areas import HBr, or bromine for conversion to HBr; but such importation is complicated by the fact that bromine and HBr are corrosive thereby requiring special vessels during shipment.

Organic bromides, such as ethylene dibromide, are non-corrosive, and can be transported as any other liquid such as by pipeline or in the hold of a tanker. In order for the transportation of organic bromides as bromine sources to be economical, a convenient method for recovering the bromine values in a useful form is necessary. Regardless of the problems encountered in transporting bromine and HBr, an improved method of recovering bromine values from excess organic bromides would be desirable.

Ethylene dibromide can be thermally cracked to provide vinyl bromide and HBr; however, even at 100% conversions, only one molecule of HBr is produced per molecule EDB cracked. In order to recover the maximum amount of bromine as HBr, a catalyzed reduction with $H_2$ is necessary. It has been reported that chlorobenzenes have been reduced with a nickel at temperatures of 270° C and above. In this process there is a constant loss of nickel due to the vapor pressure of nickel halides as these higher temperatures and the catalyst is rapidly depleted.

It is an object of the present invention to provide a novel method for the recovery of the bromine values of organic bromides. An additional object is to provide such a method in which the bromine values are recovered as HBr.

It is an additional object to provide such a method which results in a larger percentage of bromine being recovered than does the uncatalyzed thermal cracking of organic bromides.

A further object is to provide such a method which employs as a catalyst a composition which does not form halides which are highly volatile under the conditions of the reaction.

SUMMARY OF THE INVENTION

The present invention involves a method for the recovery of bromine values from organic bromides. The process involves reacting the organic bromide with hydrogen at a temperature within the range of from 300° to 600° C in the presence of a suitable catalyst. Examples of suitable catalysts are the oxides of chromium, vanadium, tungsten, cerium, molybdenum or aluminum.

DESCRIPTION OF PREFERRED EMBODIMENTS

Preferred organic bromides for use as bromine sources are those aliphatic bromides containing up to six carbon atoms. Aromatic bromides, having bromine attached to either the ring, or side chain in the case of alkaryl bromides, are operable. Those alkaryl bromides containing up to 9 carbon atoms are preferred. Selection of organic bromides containing more than the preferred number of carbon atoms, while providing an operable process, results in rapid accumulation of tars in the reaction zone. Organic bromides having only one or two carbon atoms, e.g., ethylene dibromide and methylene bromide are especially useful bromine sources. Examples of other aliphatic bromides which may be employed in the process as bromine source materials are mono- or poly-brominated hexanes, pentenes pentynes, cyclobutanes, propanes, and propenes. Aromatic bromides useful in the process are, for example, the mono- or poly-brominated benzenes, toluenes, ethylbenzenes, dipropyl benzenes, diphenyls, and napthtalenes.

In one mode of practicing the invention, the catalyst bed is heated to the desired reaction temperature and the gaseous organic bromide/hydrogen mixture is contacted with the catalyst, as by flowing the mixture through the catalyst bed. The catalyzed reaction results in the bromine values of the organic bromide being converted to readily usable HBr. For substantially complete conversion to HBr, the reaction should be carried out at a temperature of from 400° to 600° C, with an excess of hydrogen of at least about 0.55 mole hydrogen per mole of bromine contained in the organic bromide, e.g., a mole ratio of $H_2$/organic bromide of at least about 1.1/1 should be used when ethylene dibromide (EDB) is the bromine source and substantially complete conversions are desired. Residence times of 5 to 60 seconds are preferred under the reaction conditions set out above. If some intermediate bromides are desired as byproducts, e.g., $CH_2 = CHBr$ from $CH_2BrCH_2Br$ or $CH_3Br$ from $CH_2Br_2$, lower mole ratios of hydrogen to organic bromide and lower temperatures are used. Temperatures above 550° C increase the amount of carbon formation on the catalyst making relatively frequent regenerations necessary. Accordingly a reaction temperature of from 400° to 550° C is preferred for maximum conversion to HBr with maximum catalyst life.

The metal oxide catalyst is normally a combination of two or more of the oxides of chromium, vanadium, tungsten, cerium, molybdenum or aluminum. As is the case with the use of metal oxides as cracking catalysts, the major component supports the minor component upon which it has been placed by impregnation. Commercially available metal oxide cracking catalysts may be used in the practice of the invention. A chromia/alumina catalyst with chromia comprising from 5 to 50 weight percent of the combination is preferred. The catalyst may contain substantial amounts of inactive ingredients in addition to the metal oxides. Other useful metal oxide combinations are $V_2O_5$ supported by $Al_2O_3$, $CeO_2$ supported by $Al_2O_3$ and $Cr_2O_3 + V_2O_5$ supported by $Al_2O_3$. As is the case with most gas phase catalyzed reactions, a catalyst having a high surface area is desirable. Those metal oxide catalysts having a BET surface area of from 25 to 100 $m^2$/gm. are preferred.

The oxidation state of metal oxide is not critical. All of the known oxides of aluminum, chromium, vanadium, molybdenum or tungsten may be used as catalyst. Examples of such oxides are $Al_2O_3$, $Cr_2O_3$, $V_2O_3$, $V_2O_5$, $MoO_3$, $Mo_3O_8$, $Mo_2O_5$, $MoO_2$, $CeO_2$, $WO_2$, $W_2O_3$, and $W_2O_5$. Under the reaction conditions, the metals will be reduced to their lowest oxidation state.

The invention is further illustrated by the following examples.

Examples 1–5

A ¾ inch by 30 inch Vycor tube was packed with 5/32 inch diameter pellets of a chromia-alumina cracking catalyst. The catalyst consisted of 19 weight percent $Cr_2O_3$ supported by $Al_2O_3$ which accounted for the balance. The catalyst had a density of 60 lb/ft³ and a BET surface area of 60 m²/gm. The tube was heated over 24 inches of its length with an electric resistance furnace.

Ethylene dibromide was introduced into the top of the reactor from a dropping funnel and hydrogen was metered through the reactor just above the furnace. The exit gases passed through an air cooled trap, a water scrubber, a calcium chloride drier and a dry ice cooled trap.

With the furnace controlled at 520° C, ethylene dibromide (118 gm., 0.627M) and $H_2$ (0.90M) was passed through the reactor in 2 hours and 20 minutes. This gave a mole ratio ($H_2$/EDB) of 1.43 and a residence time of 14 seconds.

Analysis of the scrubber solution showed that 1.19 moles of HBr had been formed. Chromatographic analysis of the 3.5 gm. of liquid found in the dry ice trap indicated that it was mainly ethyl bromide (80%) and vinyl bromide (20%). The bromine recovery was as follows:

```
HBr      — 1.19 M             94.9%
C₂H₅Br —  .032 M              2.6%
          (as HBr)
C₂H₃Br —  .008 M              .5%
          (as HBr)
          Total Br recovery   98.0%
```

The gases passing through the cold trap were analyzed by mass spectroscopy and found to be $CH_2=CH_2$ with a small amount of ethane and $CH_2=CHBr$ and $CH_3CH_2Br$ as minor components. Table I summarizes the results of five runs made in the above-described manner.

Example 6

Methylene bromide, $CH_2BR_2$, was also reacted with hydrogen using the equipment and catalyst described in Example 1. The procedure was as follows:

Methylene bromide, 0.57 mole, and $H_2$, 0.6 mole, were reacted at 500°C. The mole ratio ($H_2$/ $CH_2Br_2$) was 1.05 and the reactor temperature was 500°C. The flow rate was adjusted to provide a residence time of 10 seconds. The HBr recovered from the water scrubber was 0.966 M or 84.5% of the bromine fed. Eight grams of methyl bromide containing a trace of $CH_2Br_2$ were recovered from the dry ice trap. This calculates to 0.084 M or 7.4% of the bromine fed giving a total bromine recovery of 91.99%.

TABLE I

| Example No. | Furnace Temp °C | Moles Fed $H_2$ | Moles Fed EDB | $H_2$/EDB Mole Ratio | Residence Time - Sec | Moles HBr | Moles $C_2H_5Br+$ $C_2H_3Br$ | % Conversion to HBr | % Conversion to $C_2H_5Br+$ $C_2H_3Br$ | % Bromine Recovery |
|---|---|---|---|---|---|---|---|---|---|---|
| 1 | 550 | 1.23 | 0.617 | 1.99 | 10.0 | 1.093 | | 88.6 | | 88.6 |
| 2 | 520 | 0.90 | 0.627 | 1.43 | 14.0 | 1.19 | 0.032 | 94.9 | 5.1 | 97.5 |
| 3 | 500 | 0.612 | 0.612 | 1.0 | 7.9 | 1.143 | 0.087 | 93.0 | 14.0 | 100.0 |
| 4 | 300 | 0.23 | 0.239 | 0.98 | 10.6 | 0.233 | 0.051[1] | 49.7 | 21.8 | 97.0 |
| 5[2] | 500 | 0.715 | 0.617 | 1.16 | 14.4 | 0.84 | 0.382 (pure $C_2H_3Br$) | 68.0[3] | 62.0 | 99.0 |

[1]The analysis of this material was 81% vinyl bromide and 19% ethyl bromide. In addition to this cold trap material 16 gr., 0.085 M. of EDB representing 0.17 M of HBr were recovered from the air cooled trap and scrubber unreacted.
[2]Furnace packed with vycor rings — no catalyst.
[3]Actual total conversion of EDB to HBr was 38%.

What is claimed is:

1. A process which comprises reacting an organic bromide with hydrogen at a temperature within the range from about 300° to about 600°C. in the presence of a catalyst, said catalyst being selected from two or more of the oxides of chromium, vanadium, tungsten, cerium, molybdenum or aluminum; and separating HBr from the reaction product.

2. The process of claim 1 wherein the catalysts are selected from the group consisting of $Cr_2O_3$, $Al_2O_3$, $V_2O_3$, $MoO_3$, $Mo_3O_8$, $Mo_2O_5$, $MoO_2$, $CeO_2$, $WO_2$, $W_2O_5$, $W_2O_3$.

3. The process of claim 1 wherein the catalysts are selected from the group consisting of $Al_2O_3$, $Cr_2O_3$, $MoO_2$, $W_2O_3$.

4. The process of claim 1 wherein the organic bromide is an aliphatic bromide containing up to six carbon atoms or an aromatic bromide containing up to nine carbon atoms.

5. The process of claim 1 wherein the organic bromide is ethylene dibromide or methylene bromide.

6. The process of claim 1 wherein the reaction is carried out at a temperature of from 400° to 550°C.

7. A process which comprises reacting an organic bromide with hydrogen at a temperature within the range of from about 300° to about 600°C in the presence of a catalyst, the catalyst being a mixture of the oxides of chromium and aluminum; and separating HBr from the reaction product.

8. The process of claim 7 wherein the organic bromide is ethylene dibromide or methylene bromide.

9. The process of claim 7 wherein the catalyst is a mixture of $Al_2O_3$ and $Cr_2O_3$.

10. The process of claim 9 wherein the organic bromide is ethylene dibromide or methylene bromide.

11. The process of claim 10 wherein the reaction temperature is from 400° to 550°C. and the mole ratio of $H_2$/organic bromide is at least about 1.1/1.

12. The process of claim 11 wherein the metal oxide catalyst has a BET surface area of from 23 to 100 m²/gm.

13. The process of claim 1 wherein the organic bromide has a resistance time in the heated reaction zone of from 5 to 60 seconds.

14. The process of claim 1 wherein the catalyst has a BET surface area of from 25 to 100 m$^2$/gm.

15. The process of claim 11 wherein the catalyst is a mixture of Al$_2$O$_3$, and Cr$_2$O$_3$; the organic bromide is ethylene dibromide or methylene bromide and the temperature is within the range of from 400° to 550°C.

16. The process of claim 9 wherein the organic bromide is an aliphatic bromide containing up to six carbon atoms or an aromatic bromide containing up to nine carbon atoms.

17. The process of claim 9 wherein the reaction is carried out at a temperature of from 400° to 550° C.

18. The process of claim 9 wherein the organic bromide has a residence time in the heated reaction zone of from 5 to 60 seconds.

19. The process of claim 9 wherein the catalyst has a BET surface area of from 25 to 100 m$^2$/gm.

20. A process for recovering bromine as HBr from aliphatic organic bromides which comprises reacting the organic bromide with hydrogen at a temperature within a range from about 300° to about 600° C. in the presence of a mixture of alumina and a catalytic amount of chromia; and separating the HBr from the reaction product.

21. The process of claim 20 wherein the aliphatic organic bromide contains up to 6 carbon atoms.

22. The process of claim 21 wherein the organic bromide is ethylene dibromide.

23. The process of claim 21 wherein the organic bromide is methylene bromide.

24. The process of claim 20 wherein the reaction is carried out at a temperature of from 400° to 550° C.

25. The process of claim 24 wherein the mole ratio of H$_2$ to organic bromide is at least about 1.1 : 1.

26. The process of claim 20 wherein the catalyst has a BET surface area of from 25 to 100 m$^2$/gm.

27. The process of claim 20 wherein the organic bromide has a residence time in the heated reaction zone of from 5 to 60 seconds.

28. A process which comprises reacting an organic bromide with hydrogen at a temperature within the range from about 300° to about 600° C. in the presence of a catalytic amount of a catalyst selected from one or more of the oxides of chromium, vanadium, tungsten and molybdenum; and separating HBr from the reaction product.

29. The process of claim 28 wherein the catalyst is selected from one or more of the oxides of chromium, tungsten and molybdenum.

30. The process of claim 28 wherein the catalyst is in contact with a supporting surface.

31. The process of claim 28 wherein the catalyst is supported by aluminum oxide.

32. The process of claim 20 wherein the chromia comprises from 5 to 50 weight percent of the mixture.

33. The process of claim 32 wherein the chromia is Cr$_2$O$_3$.

34. The process of claim 22 wherein at least 1.1 moles of hydrogen is reacted with 1 mole of ethylene dibromide at a temperature within the range from 400° to 600° C. in the presence of a catalytic mixture of alumina and from 5 to 50 weight percent chromia, the catalyst having a BET surface area of from 25 to 100 m$^2$/gm.

* * * * *

UNITED STATES PATENT OFFICE
CERTIFICATE OF CORRECTION

PATENT NO. : 3,875,293

DATED : April 1, 1975

INVENTOR(S) : Ralph A. Davis

It is certified that error appears in the above-identified patent and that said Letters Patent are hereby corrected as shown below:

Col. 1, line 31, after "molecule" insert --of--;

Col. 1, line 37, change "as" to --at--;

Col. 3, line 39, change "was" to --were--;

Col. 4, line 66, change "23" to --25--;

Col. 5, line 2, change "resistance" to --residence--.

Signed and sealed this 15th day of July 1975.

(SEAL)
Attest:

RUTH C. MASON
Attesting Officer

C. MARSHALL DANN
Commissioner of Patents
and Trademarks